Nov. 24, 1942.    W. HAERTEL    2,303,271
CEILING STRUCTURE
Filed May 16, 1940
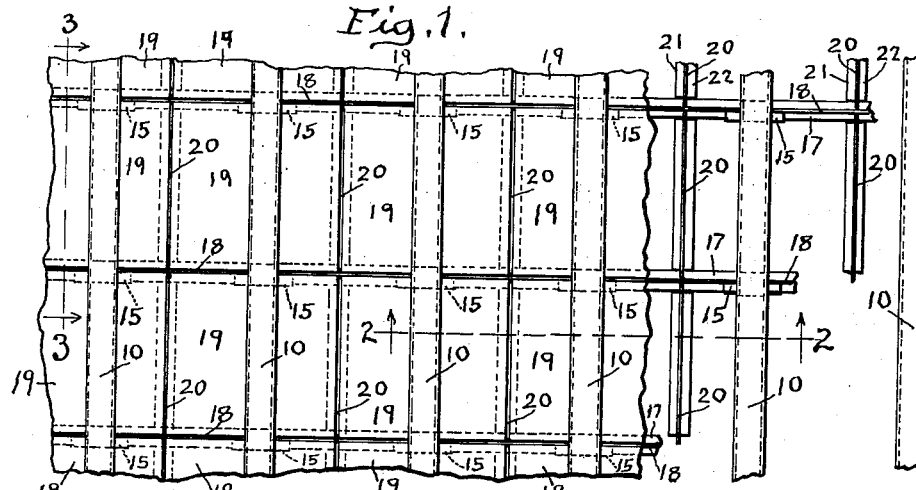
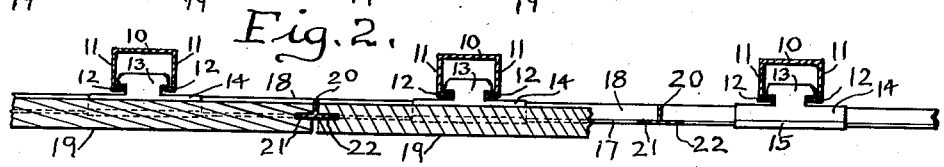
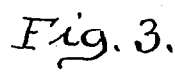
Fig. 3.
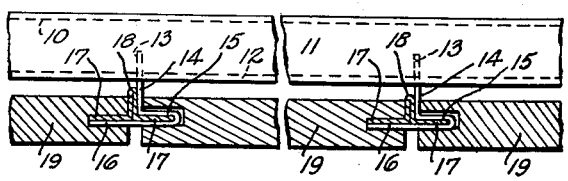
Fig. 4.
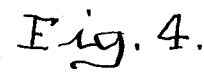
Fig. 7.
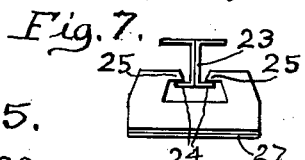
Fig. 5.
Fig. 6.
Fig. 8.
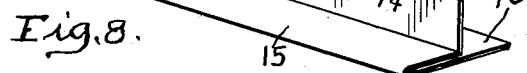
INVENTOR
William Haertel
by J. McRoberts
his attorney Patented Nov. 24, 1942

2,303,271

UNITED STATES PATENT OFFICE 2,303,271

CEILING STRUCTURE

William Haertel, Oak Park, Ill.

Application May 16, 1940, Serial No. 335,567

4 Claims. (Cl. 72—118)

My invention relates to ceiling structures adapted to support acoustical tiles, and its main object is to provide a simple and efficient metallic suspension for the tiles which embraces inverted T-shaped metallic suspension members whose flanges enter grooves in the edges of the tiles, and metallic clips which are hung from hangers carried by the usual floor construction and provide extended and resilient saddles to engage flanges of the suspension members. A further object is to provide a clip of this character which is inexpensive to manufacture from metal blanks and provides a suspension head and one-piece body which is bent at its lower portion into opposite flanges to support and interlock with the flanges of the suspension members. Other objects will be apparent from the disclosure.

In the accompanying drawing which illustrates my invention, Fig. 1 is a top plan view of a ceiling structure embodying sound-absorbing tiles supported by my suspension devices, parts being broken away for convenience of illustration; Fig. 2 is a detail sectional view taken in the plane of line 2—2 in Fig. 1, the parts being shown on an enlarged scale; Fig. 3 is a similar view in the plane of the line 3—3 in Fig. 1; Fig. 4 is a perspective view of part of one of the metallic T suspension members; Fig. 5 is a similar view of part of one of the metallic transverse T suspension members; Fig. 6 is a similar view of one of the metallic clips; Figs. 7 and 8 are views showing a modified form of construction of the clips and their supporting members.

In the drawing, the reference numeral 10 indicates metallic channel members which are carried by suitable supporting members provided in the ceiling construction, such as parallel metallic runners spaced about four feet apart on centers and hung to present a level under surface. Where there is a plastered ceiling construction, the channel members may be attached to it by suitable toggle bolts and brought to a level surface. The channels are formed in cross-section with opposite depending webs 11 and inturned flanges 12 forming supporting runways for the suspension clips.

The clips are made from flat blanks of galvanized metal, having T-shaped heads 13 adapted to enter the channels in the members 10 and depending skirts 14 whose lower portions are bent and rebent to form opposite flanges 15 and 16. The latter flange extends on both sides of the skirt and forms a wide cross-saddle for the flanges 17 of the associated tile suspension members 18. The latter are inverted metallic T members extending below and transverse to the channel members 10. The flanges 15 and 16 of the clips are elongated in the line of the flanges 17 of the suspension members 18 to afford extended support for the latter, and the spaces between the flanges 15 and 16 into which the flanges 17 of the members 18 enter is reduced so that the flanges 17 are tightly gripped by the flanges 15 and 16. This construction affords an elongated and wide seat for the suspension members, and the resiliency of the flanges 16 causes the clips to tightly grip the flanges 17 and interlock the parts together. The flanges 17 of the suspension members engage grooves in the edges of the tiles 19, which are of predetermined length and breadth, their latter dimension being appropriate to fill the spaces between the median lines of the parallel supporting members 10.

Similar T-shaped suspension members 20 shown in Fig. 5 are installed transversely of the members 18 between the ends of adjacent tiles in the rows, with their lateral flanges 21 and 22 in the grooves in the tile ends. The flanges 21 and 22 are cut-back at their ends so that they aline with the flanges 17 of the members 18 to make smooth joints in the line of the grooves in the tiles. The projecting ends of the suspension members 20 rest on the flanges 17, so that the entire tile-suspending structure is carried by the clips 13.

In Figs. 7 and 8 I show a modified construction of the clips used when their supporting members are in the form of I-beams 23 having out-turned webs 24. In this embodiment the clips are cut-away in their upper portion to provide clearance with their supporting beams, and are formed with opposite inwardly directed arms 25 resting on the webs 24 and with flanges 26 and 27 corresponding to the flanges 15 and 16.

When the clips are used adjacent to a wall, their lower flanges 16 or 27 are omitted.

I claim:

1. A metallic clip for ceiling structures having a T-shaped suspension head, a depending skirt, a flange extending at substantially a right angle from the skirt, and a second flange extending from the outer line of said first flange across the latter and beyond the line of said skirt and forming a resilient seat below said first flange.

2. In a ceiling structure, the combination of a metallic clip having a T-shaped suspension head, a depending skirt and opposite lateral flanges forming a resilient seat, and T-shaped tile-suspending members whose flanges interlock with said seat and form supports for an acoustical tile.

3. A metallic clip for ceiling structures having a T-shaped head, a depending skirt, a flange extending at substantially a right angle from the skirt, and a second flange extending from the outer line of said first flange across the latter and beyond the line of said skirt and forming a resilient seat below said first flange.

4. In a ceiling structure, the combination of a metallic clip having a T-shaped head, a depending skirt and opposite lateral flanges forming a resilient seat, T-shaped tile-suspending members whose flanges interlock with said seat and form supports for an acoustical tile, and T-shaped cross-suspending members whose flanges are cut-back in line with the flanges of the T-members and whose vertical portions rest on said T-members.

WILLIAM HAERTEL.